Patented Nov. 10, 1936

2,060,665

UNITED STATES PATENT OFFICE 2,060,665

RESINOUS COMPOSITIONS

Walter W. Durant, Pittsfield, Mass., and Paul H. Scrutchfield, Evanston, Ill., assignors to General Electric Company, a corporation of New York No Drawing. Original application February 26, 1931, Serial No. 518,497. Divided and this application October 28, 1933, Serial No. 695,668

3 Claims. (Cl. 91—68)

This application is a division of our copending application Serial No. 518,497 filed Feb. 26, 1931.

The present invention relates to resinous compositions and more particularly to resinous compositions of the alkyd type. Specifically, this invention is concerned with a coating composition embodying a resin of the alkyd type and which is especially useful in coating fibrous material, such as cloth, paper and the like in order to impart thereto and provide thereon a flexible, tough film of good dielectric value, unaffected by mineral oil or by petroleum or aromatic solvents.

In accordance with our invention we have found that we can prepare a coating composition which is especially adapted to the manufacture of varnished cambric employed for electrical insulation purposes but which is, however, not limited to such use. It may be used wherever an oil resistant, very flexible varnished cloth is desired; for example, as diaphragms for gasoline pumps or for diaphragms of pressure type oil level indicators for storage tanks.

For a consideration of what we believe to be novel in our invention attention is directed to the following specification and the claims appended thereto.

Alkyd resins comprise those complexes resulting primarily from the interaction of a polyhydric alcohol, such as glycerine, and a polybasic acid, such as phthalic acid or its anhydride. For carrying out the purposes of our invention we have found that if we react with the polyhydric alcohol and polybasic acid, a dihydric alcohol and a dibasic aliphatic acid, together with a natural resin or resinic acid derived therefrom, such as abietic acid, and a vegetable oil, preferably a drying oil, we obtain a resinous composition admirably suited for producing a liquid coating composition which yields on curing a tough, very flexible, oil resistant, alkali and acid resistant, non-soluble film of good dielectric value.

Our invention will be best understood by reference to the following specific examples which are merely illustrative in nature.

One method of producing a liquid coating composition of our invention is as follows:

Example 1

| | Parts by weight |
|---|---|
| Phthalic anhydride | 213 |
| Glycerine | 129 |
| Succinic acid | 456 |
| Ethylene glycol | 242 |
| Rosin | 200 |
| Chinawood oil | 80 |

The above ingredients are mixed together and heated to 250° C. as quickly as possible and held at this temperature until the resin has become clear and until the acid number is less than 25 milligrams of NaOH per gram of resin. The temperature to which the ingredients are initially heated is not fixed at 250° C. It may vary from 230° C. to 270° C. The resin is dissolved in a suitable solvent, for example, acetone, ethyl cellosolve, butyl, carbitol, cellosolve acetate, ethyl acetate, furfural, toluol, alcohol, or a suitable combination of these.

A varnish such as described above makes a very satisfactory coating material for cloth or paper. Varnished cambric made in this way is extremely flexible, has great toughness, good dielectric strength, extremely low oil solubility and is unaffected by heating at 100° to 150° C. for a period of two weeks or longer. The curing time of this varnish in reasonably thin films is about 4 hours at 135° to 140° C.

The proportions of resinous ingredients may be varied and in order to illustrate this the following example is given. This resinous composition, prepared in a manner similar to that given above, is slightly less flexible than the first composition but has, however, a somewhat faster curing time and gives a harder and tougher film.

Example 2

| | Parts by weight |
|---|---|
| Phthalic anhydride | 235 |
| Glycerine | 118 |
| Succinic acid | 235 |
| Ethylene glycol | 230 |
| Rosin | 200 |
| Chinawood oil | 80 |

Another example of the preparation of a resin in accordance with the method outlined in Example 1 is the following:

Example 3

| | Parts by weight |
|---|---|
| Phthalic anhydride | 426 |
| Glycerine | 258 |
| Ethylene glycol | 484 |
| Succinic acid | 912 |
| Dammar gum | 400 |
| Chinawood oil | 160 |

A second method of preparing resinous compositions in accordance with our invention is illustrated by the following example:

Example 4

| | Parts by weight |
|---|---|
| Phthalic anhydride | 852 |
| Ethylene glycol | 356 |
| Rosin | 800 |
| Glycerol | 180 | are heated to approximately 210° C. with stirring, and 320 parts by weight of Chinawood oil are added. The temperature of the mass is now raised to 240° C. and the resin cooked until it is clear. 612 parts by weight of ethylene glycol and 1168 parts by weight of succinic acid are now added. The resinous mass is again heated until it is clear. 336 parts by weight of glycerine and 648 parts by weight of succinic acid are added and the mass cooked until it is clear.

Still another method of producing the resinous compositions of our invention is illustrated by the following example:

*Example 5*

|  | Parts by weight |
|---|---|
| Abietic acid | 800 |
| Glycerine (50% excess) | 770 |
| Phthalic anhydride | 852 |
| Ethylene glycol | 965 |
| Linseed oil fatty acids | 80 |

The above ingredients are heated under reflux to 175° to 180° C. for approximately 30 minutes and 320 parts by weight of Chinawood oil are added in four parts. The mass is then cooked at 240° C. until it is clear. 1820 parts by weight of succinic acid are added and the mass cooked until the resin is formed. The excess glycerine is removed by vacuum distillation. This method gives a resin with a lower acid number than the first method described above.

It is of course understood that our invention is not limited to the specific ingredients named above in the illustrative examples. For example, as dihydric alcohols we may employ such alcohols as propylene glycol, diethylene glycol, tetramethylene glycol and the like; as dibasic aliphatic acids we may use such acids as malic, maleic, fumaric, glytaric, adipic, pimelic, suberic acids and the like. Other polybasic acids besides phthalic acid or its anhydride, and polyhydric alcohols other than glycerine, especially those having three or more hydroxyl groups in the molecule, may be employed in preparing an alkyd resin. Instead of rosin, other natural resins or the acids derived therefrom, for example, dammar, kauri, copal and the like may be used; and in place of Chinawood oil, any vegetable oil, preferably a drying oil, such as linseed oil, perilla oil, soya bean oil and the like may be used.

What we claim as new and desire to secure by Letters Patent of the United States, is:—

1. A tough, permanently flexible, water and oil resistant, dielectric varnished cambric containing between the fibres thereof and being coated with a flexible resin which is the product of reaction of a polybasic acid, a polyhydric alcohol having three or more hydroxyl groups in the molecule, a dibasic aliphatic acid, a dihydric alcohol, a natural resin or the acid derived therefrom and a vegetable oil.

2. A tough flexible, heat water and oil resistant, manufactured fibrous material impregnated and coated with a flexible alkyd resin derived from the reaction of a mass containing phthalic anhydride, glycerine, glycol, adipic acid, rosin and vegetable oil.

3. A tough, flexible, heat, water and oil resistant dielectric varnished cambric impregnated and coated with the cured reaction product of phthalic anhydride, glycerine, succinic acid, ethylene glycol, rosin and Chinawood oil, the resulting resin combined with said cloth giving the aforesaid properties to it.

WALTER W. DURANT.
PAUL H. SCRUTCHFIELD.

---

CERTIFICATE OF CORRECTION.

Patent No. 2,060,665. November 10, 1936.

WALTER W. DURANT, ET AL.

It is hereby certified that error appears in the printed specification of the above numbered patent requiring correction as follows: Page 1, second column, line 15, for "150° C." read 105° C.; page 2, second column, line 22, claim 2, after the words "tough" and "heat" insert a comma; and that the said Letters Patent should be read with these corrections therein that the same may conform to the record of the case in the Patent Office.

Signed and sealed this 12th day of January, A. D. 1937.

Henry Van Arsdale (Seal) Acting Commissioner of Patents.

clear. 612 parts by weight of ethylene glycol and 1168 parts by weight of succinic acid are now added. The resinous mass is again heated until it is clear. 336 parts by weight of glycerine and 648 parts by weight of succinic acid are added and the mass cooked until it is clear.

Still another method of producing the resinous compositions of our invention is illustrated by the following example:

Example 5

| | Parts by weight |
|---|---|
| Abietic acid | 800 |
| Glycerine (50% excess) | 770 |
| Phthalic anhydride | 852 |
| Ethylene glycol | 965 |
| Linseed oil fatty acids | 80 |

The above ingredients are heated under reflux to 175° to 180° C. for approximately 30 minutes and 320 parts by weight of Chinawood oil are added in four parts. The mass is then cooked at 240° C. until it is clear. 1820 parts by weight of succinic acid are added and the mass cooked until the resin is formed. The excess glycerine is removed by vacuum distillation. This method gives a resin with a lower acid number than the first method described above.

It is of course understood that our invention is not limited to the specific ingredients named above in the illustrative examples. For example, as dihydric alcohols we may employ such alcohols as propylene glycol, diethylene glycol, tetramethylene glycol and the like; as dibasic aliphatic acids we may use such acids as malic, maleic, fumaric, glytaric, adipic, pimelic, suberic acids and the like. Other polybasic acids besides phthalic acid or its anhydride, and polyhydric alcohols other than glycerine, especially those having three or more hydroxyl groups in the molecule, may be employed in preparing an alkyd resin. Instead of rosin, other natural resins or the acids derived therefrom, for example, dammar, kauri, copal and the like may be used; and in place of Chinawood oil, any vegetable oil, preferably a drying oil, such as linseed oil, perilla oil, soya bean oil and the like may be used.

What we claim as new and desire to secure by Letters Patent of the United States, is:—

1. A tough, permanently flexible, water and oil resistant, dielectric varnished cambric containing between the fibres thereof and being coated with a flexible resin which is the product of reaction of a polybasic acid, a polyhydric alcohol having three or more hydroxyl groups in the molecule, a dibasic aliphatic acid, a dihydric alcohol, a natural resin or the acid derived therefrom and a vegetable oil.

2. A tough flexible, heat water and oil resistant, manufactured fibrous material impregnated and coated with a flexible alkyd resin derived from the reaction of a mass containing phthalic anhydride, glycerine, glycol, adipic acid, rosin and vegetable oil.

3. A tough, flexible, heat, water and oil resistant dielectric varnished cambric impregnated and coated with the cured reaction product of phthalic anhydride, glycerine, succinic acid, ethylene glycol, rosin and Chinawood oil, the resulting resin combined with said cloth giving the aforesaid properties to it.

WALTER W. DURANT.
PAUL H. SCRUTCHFIELD.

---

CERTIFICATE OF CORRECTION.

Patent No. 2,060,665.             November 10, 1936.

WALTER W. DURANT, ET AL.

It is hereby certified that error appears in the printed specification of the above numbered patent requiring correction as follows: Page 1, second column, line 15, for "150° C." read 105° C.; page 2, second column, line 22, claim 2, after the words "tough" and "heat" insert a comma; and that the said Letters Patent should be read with these corrections therein that the same may conform to the record of the case in the Patent Office.

Signed and sealed this 12th day of January, A. D. 1937.

Henry Van Arsdale (Seal)          Acting Commissioner of Patents.

CERTIFICATE OF CORRECTION.

Patent No. 2,060,665. November 10, 1936.

WALTER W. DURANT, ET AL.

It is hereby certified that error appears in the printed specification of the above numbered patent requiring correction as follows: Page 1, second column, line 15, for "150° C." read 105° C.; page 2, second column, line 22, claim 2, after the words "tough" and "heat" insert a comma; and that the said Letters Patent should be read with these corrections therein that the same may conform to the record of the case in the Patent Office.

Signed and sealed this 12th day of January, A. D. 1937.

Henry Van Arsdale (Seal) Acting Commissioner of Patents.